UNITED STATES PATENT OFFICE.

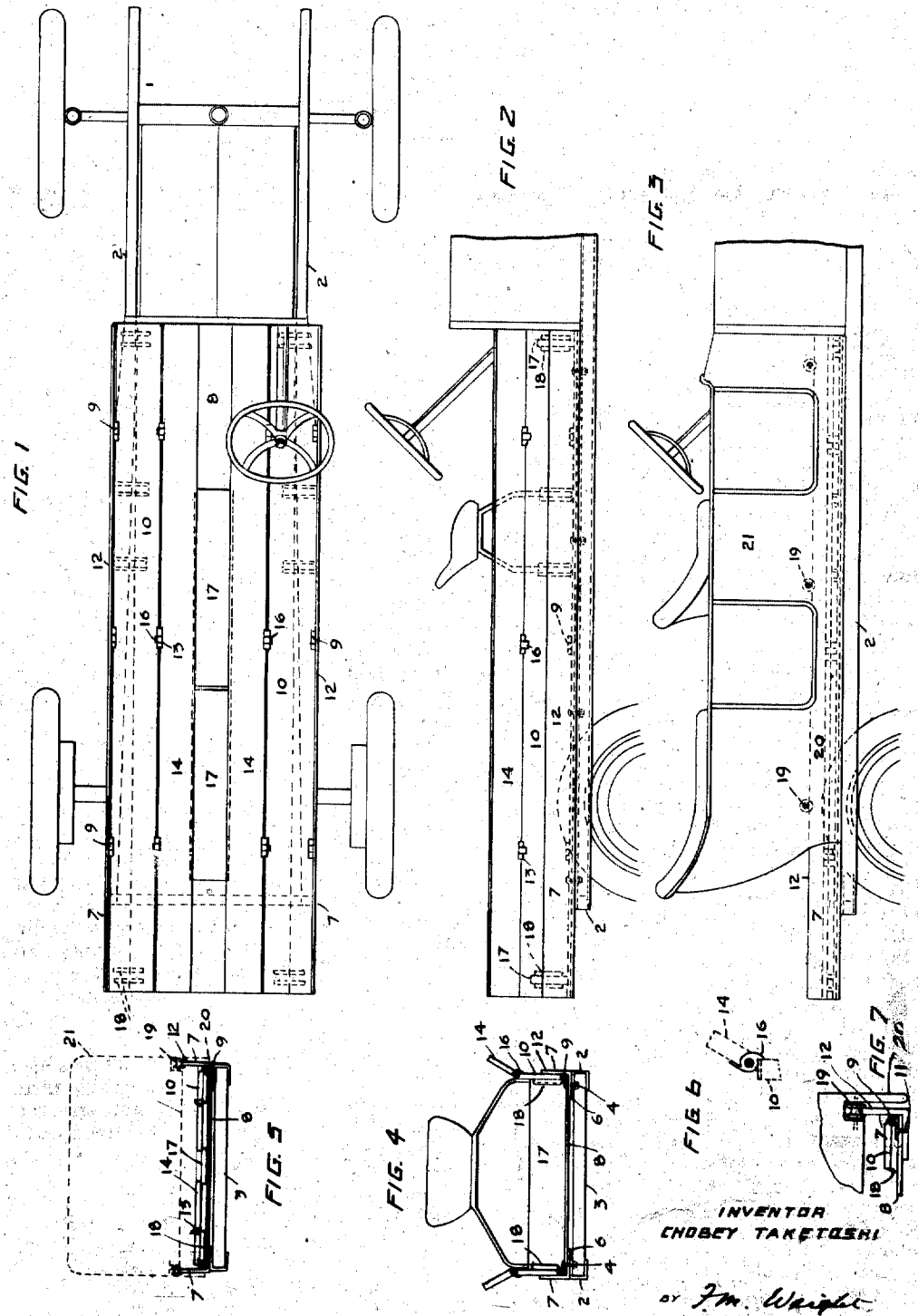

CHOBEY TAKETOSHI, OF SAN FRANCISCO, CALIFORNIA.

CONVERTIBLE AUTOMOBILE.

1,279,609.  Specification of Letters Patent.  Patented Sept. 24, 1918.

Application filed October 6, 1917. Serial No. 195,169.

*To all whom it may concern:*

Be it known that I, CHOBEY TAKETOSHI, a subject of the Emperor of Japan, residing at San Francisco, in the county of San Francisco and State of California, have invented new and useful Improvements in Convertible Automobiles, of which the following is a specification.

The object of the present invention is to provide an automobile which may be used either as a passenger-carrier, or as an automobile truck, and can be readily converted from one to the other.

In the accompanying drawing, Figure 1 is a plan view of the chassis of an automobile, the tonneau being removed; Fig. 2 is a side view of the upper portion of the automobile when used as a truck; Fig. 3 is a similar view thereof when used as a passenger-carrier; Fig. 4 is an end view thereof when used as a truck; Fig. 5 is an end view thereof when used as a passenger-carrier; Fig. 6 is an enlarged detail sectional view of a hinge; Fig. 7 is an enlarged detail end view of a portion of the automobile when used as a passenger-carrier.

Referring to the drawing, 1 indicates the chassis of an automobile having side bars 2 in the form of channel irons, in which are secured the ends of a rear transverse bar 3. To the side bars 2 are secured, as shown at 4, the horizontal members 6 of longitudinally extending angle irons 7, to which are secured the longitudinal edges of a floor or platform 8. To the edges of said platform, in the corner spaces of said angle irons, are secured thereto, by screws 11, hinges 9, which are also attached to side plates 10 of a truck body. In Figs. 2 and 4 the side plates are shown as extending vertically upward and in contact with the inner sides of the vertical members 12 of the angle irons. To the upper edges of said side plates are hinged, as shown at 13, upper side pieces 14, the hinge members attached to said upper side pieces having lugs 16 which limit the outward movement of said upper side pieces 14.

End pieces 17 are slid vertically into guideways 18 formed in the inner sides of the ends of the side plates 10 of the truck body, thus holding the side pieces in their upright position, and forming the complete body.

The truck body can extend to any distance desired to the rear of the angle irons.

When it is desired to convert the truck into a passenger-carrying automobile, the end pieces 17 are removed and are laid lengthwise upon the center of the floor of the truck, and the side plates 10 and side pieces 14 are swung inward into a horizontal position in which the edges of the side pieces rest upon said end pieces. A passenger-carrying body 21, furnished on each side with rollers 19, is then slid upon said angle irons, the rollers rolling upon the upper edges of the angle irons, as clearly shown in Figs. 3 and 7, and said passenger-carrying body is suitably secured against longitudinal movement.

The sides of the passenger-carrying body have downward extensions 20, which conceal the main portion of the vertical members of the angle irons.

The rear portion of the frame of the truck body, when in its collapsed position, projects behind the passenger-carrying body and serves as a convenient support for a trunk or any other article which is convenient to the passengers.

I claim:

1. A convertible automobile comprising a frame, rigid upwardly extending side members rigidly secured to said frame, a floor supported by said frame, longitudinally extending side plates, each movable into a horizontal or into an upwardly extending plane, removable means for holding said plates in the latter position, and a passenger-carrying body movable longitudinally on said side members over said plates in the former position.

2. A convertible automobile comprising a frame, rigid upwardly extending side members extending rearward beyond the rear end of the frame, a floor supported by said frame, longitudinally extending side plates, each movable into a horizontal or into an upwardly extending plane, removable means for holding said plates in the latter position, and a passenger-carrying body movable longitudinally on said side members over said plates in the former position to a position in which said side members extend behind said body to serve as a trunk support.

3. A convertible automobile, comprising a chassis, having angle irons at the sides, a truck body comprising a floor and side plates hinged thereto, and a passenger-carrying body adapted to be guided by said angle irons, the sides of the passenger-carrying body having downward extensions for concealing said angle irons.

4. A convertible automobile, comprising a chassis, having angle irons at the sides, a truck body comprising a floor and side plates hinged thereto, a passenger-carrying body having rollers adapted to roll upon upper edges of said angle irons, and downward extensions for concealing said angle irons.

CHOBEY TAKETOSHI.